US012599053B2

(12) United States Patent
Sawcyn et al.

(10) Patent No.: US 12,599,053 B2
(45) Date of Patent: Apr. 14, 2026

(54) TILLAGE DISC ARM DRIFT CONTROL

(71) Applicant: Brandt Industries Canada Ltd.,
Regina (CA)

(72) Inventors: Rod Sawcyn, Regina (CA); **Blake
Neudorf, Warman (CA); Alex Hansen,**
Saskatoon (CA); Tom Stubbs,
Saskatoon (CA); Dale Summach,
Saskatoon (CA)

(73) Assignee: Brandt Industries Canada Ltd.,
Regina (CA)

( * ) Notice: Subject to any disclaimer, the term of this
patent is extended or adjusted under 35
U.S.C. 154(b) by 791 days.

(21) Appl. No.: 17/847,271

(22) Filed: Jun. 23, 2022

(65) Prior Publication Data

US 2023/0413704 A1     Dec. 28, 2023

(51) Int. Cl.
A01B 35/28       (2006.01)
A01B 33/08       (2006.01)
A01B 39/22       (2006.01)

(52) U.S. Cl.
CPC ............ A01B 35/28 (2013.01); A01B 33/087
(2013.01); A01B 39/22 (2013.01)

(58) Field of Classification Search
None
See application file for complete search history.

(56) References Cited

U.S. PATENT DOCUMENTS

| | | | | |
|---|---|---|---|---|
| 2,906,353 A * | 9/1959 | Rogers | A01B 35/22 | |
| | | | 172/708 | |
| 3,575,243 A * | 4/1971 | Mark | A01B 35/24 | |
| | | | 172/705 | |
| 3,967,685 A * | 7/1976 | Siekmeier | A01B 35/28 | |
| | | | 172/551 | |
| 4,102,406 A * | 7/1978 | Orthman | A01B 13/16 | |
| | | | 172/551 | |
| 4,312,409 A * | 1/1982 | Mills | A01B 21/04 | |
| | | | 172/551 | |
| 9,107,340 B2 * | 8/2015 | Stark | A01B 71/04 | |
| 9,609,798 B2 * | 4/2017 | Sandberg | F16F 1/545 | |
| 10,398,073 B2 * | 9/2019 | Stark | A01B 7/00 | |
| 11,317,552 B2 * | 5/2022 | Larsen | A01B 71/04 | |
| 2004/0149186 A1 * | 8/2004 | Stark | A01C 5/064 | |
| | | | 111/25 | |

* cited by examiner

*Primary Examiner* — Christopher J Sebesta
*Assistant Examiner* — Audrey L Lusk
(74) *Attorney, Agent, or Firm* — FBT Gibbons LLP

(57) ABSTRACT

A cap bracket and spacer for connecting a ground engaging
tool to a mounting bar of a cultivator is provided. The cap
bracket can include a first member having a first side and a
second side, and a second member having a first side and a
second side. The second member can be joined at the second
side to the second side of the first member with a peak
formed where the second side of the first member is joined
at the second side of the second member and a first extended
portion can be provided on a first end of the cap bracket at
the peak. The spacer can include a first connection flange, a
second connection flange, and a spacer member extending
upwards from the first connection flange and the second
connection flange to define a contact surface.

33 Claims, 15 Drawing Sheets

TILLAGE DISC ARM DRIFT CONTROL

FIELD OF THE INVENTION

The present invention relates to cultivators and more specifically to mechanisms to prevent lateral drift of ground engaging tools of the cultivator during operation.

BACKGROUND

Cultivators are used in agriculture to till a field by mechanically agitating the soil. This can be done for a number of reasons including to prepare a good seed bed for crops to be planted in the field. To create a good seed bed, the cultivator must create a uniform under surface floor. A good seed bed allows a planter, following the cultivation of the field, to properly seed the field.

With a cultivator that uses angled discs to agitate the soil, the cutting profile the discs cut into the soil is a parabolic shape which starts at its greatest width at the surface of the soil and tapers to no cut at the deepest point of the cutting profile. At the surface, the width of the cutting profile is typically less than the spacing of the discs, leaving paths of soil untouched by the discs of the cultivator as they pass through the soil in the field. However, by going faster, soil thrown from a rear edge of a disc as it cuts through the soil can fracture soil in these paths of untilled soil; breaking up the soil in these paths which can have the effect of a completely tilled pass.

The discs are connected to the cultivator by disc arms, which in turn are connected to the cultivator by torsion elements that allow the discs to trip when the discs hit an obstacle in the soil they are being pulled through. To generate the operating torque needed by the disc arm, the disc arm is clamped tightly around the torsion elements.

As the discs are pulled through the soil, each disc engages the soil at an angle which generates lateral forces in the disc and thereby the disc arm the disc is connected to. The torsion elements are typically formed of an elastic material, which can be deformed by this lateral force. This deformation of the torsion elements by the lateral force can cause the disc arm where it is connected to the cultivator to shift laterally. Additionally, where there are highly repetitive tripping cycles (i.e. hitting lots obstacles or hardened patches of soil), such as in deep tilling practices, this high demand can exasperate the lateral forces the torsion elements are subjected to.

SUMMARY OF THE INVENTION

In a first aspect, a cultivator is provided. The cultivator can include a hitch assembly connectable to a tow vehicle to tow the cultivator in a travel direction, a tilling section having a front end and a back end, a tool frame provided in the tilling section, a mounting bar provided below the tool frame, at least two adjacent ground engaging tools connected to and extending below the mounting bar. Each ground engaging tool can include a bottom bracket, a cap bracket connectable to the bottom bracket for attachment to the mounting bar, an arm attached at a top end to the bottom bracket, and a ground working tool attached to a bottom end of the arm. The cap bracket can include a first member having a first side and a second side, a second member having a first side and a second side, the second member joined at the second side to the second side of the first member, a peak formed where the second side of the first member is joined at the second side of the second member, and a first extended portion on a first end of the cap bracket at the peak.

In another aspect, a cap bracket for connecting a ground engaging tool to a mounting bar of a cultivator is provided. The cap bracket can include a first member having a first side and a second side, and a second member having a first side and a second side. The second member can be joined at the second side to the second side of the first member with a peak formed where the second side of the first member is joined at the second side of the second member and a first extended portion can be provided on a first end of the cap bracket at the peak.

In another aspect, a spacer for positioning between an adjacent pair of cap brackets where each cap bracket attaches a ground engaging tool to a cultivator is provided. The spacer can include a first connection flange, a second connection flange, and a spacer member extending upwards from the first connection flange and the second connection flange to define a contact surface.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
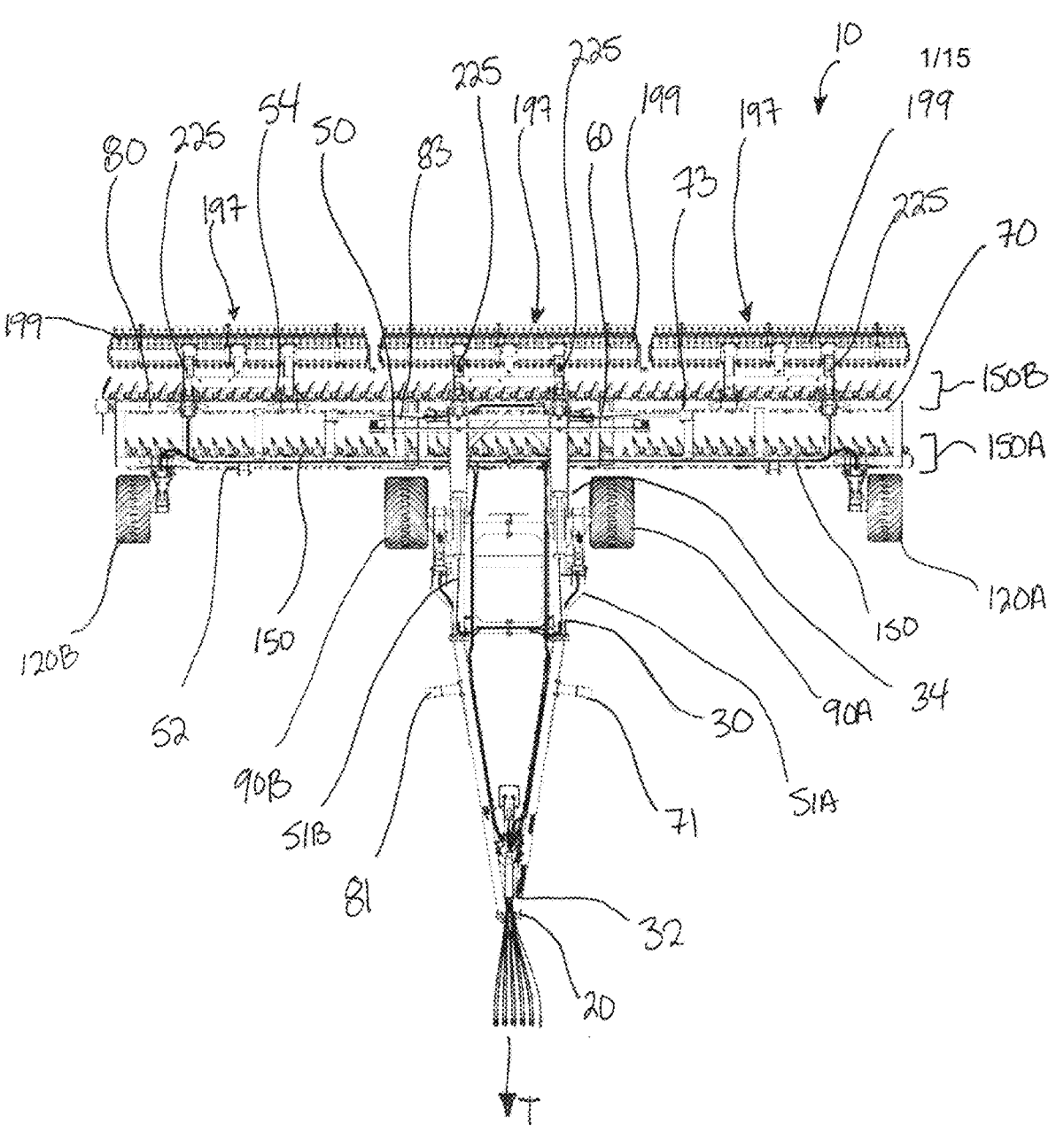
FIG. 1 is a top view of a cultivator.
Figure 2:
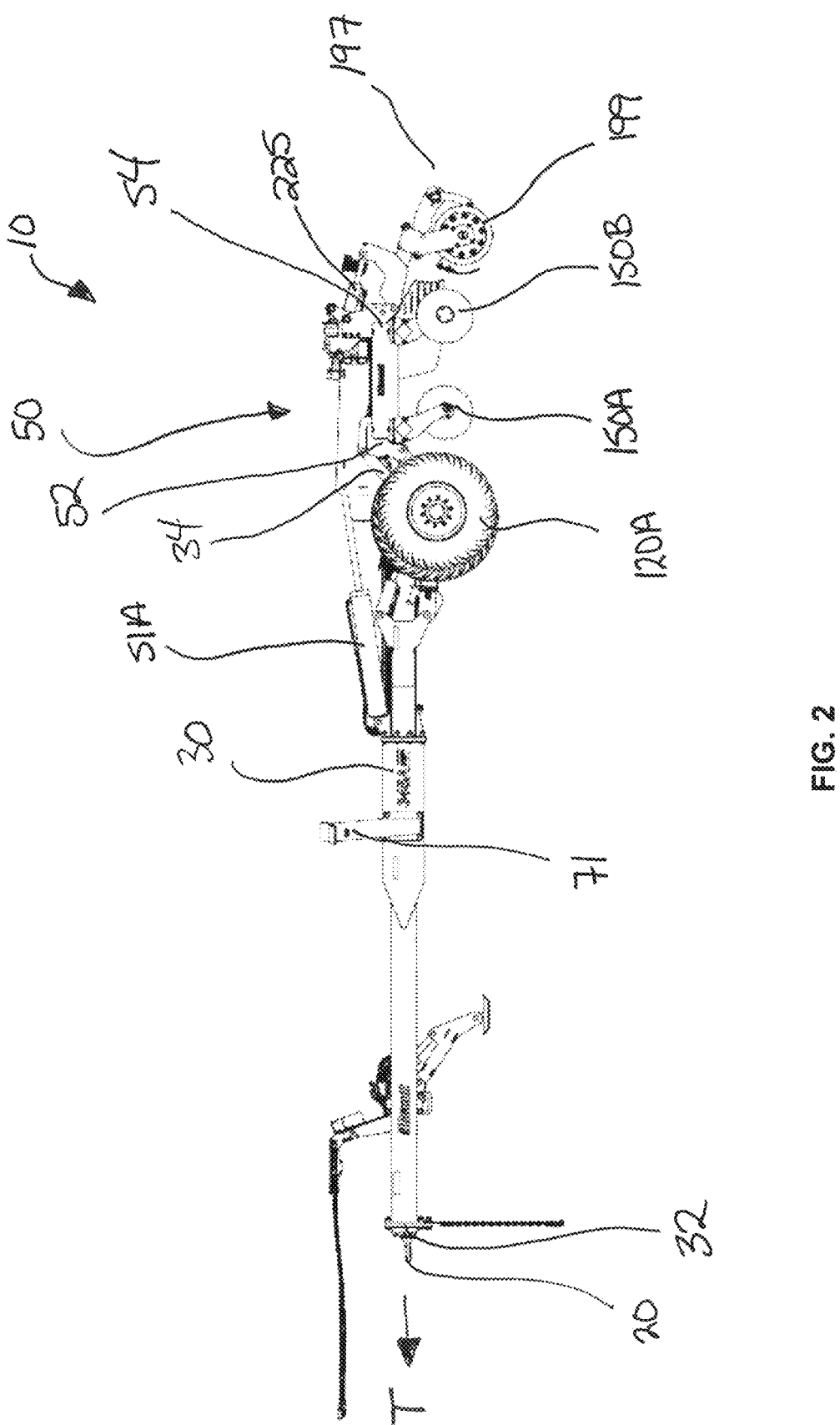
FIG. 2 is a side view of the cultivator shown in FIG. 1.
Figure 3:
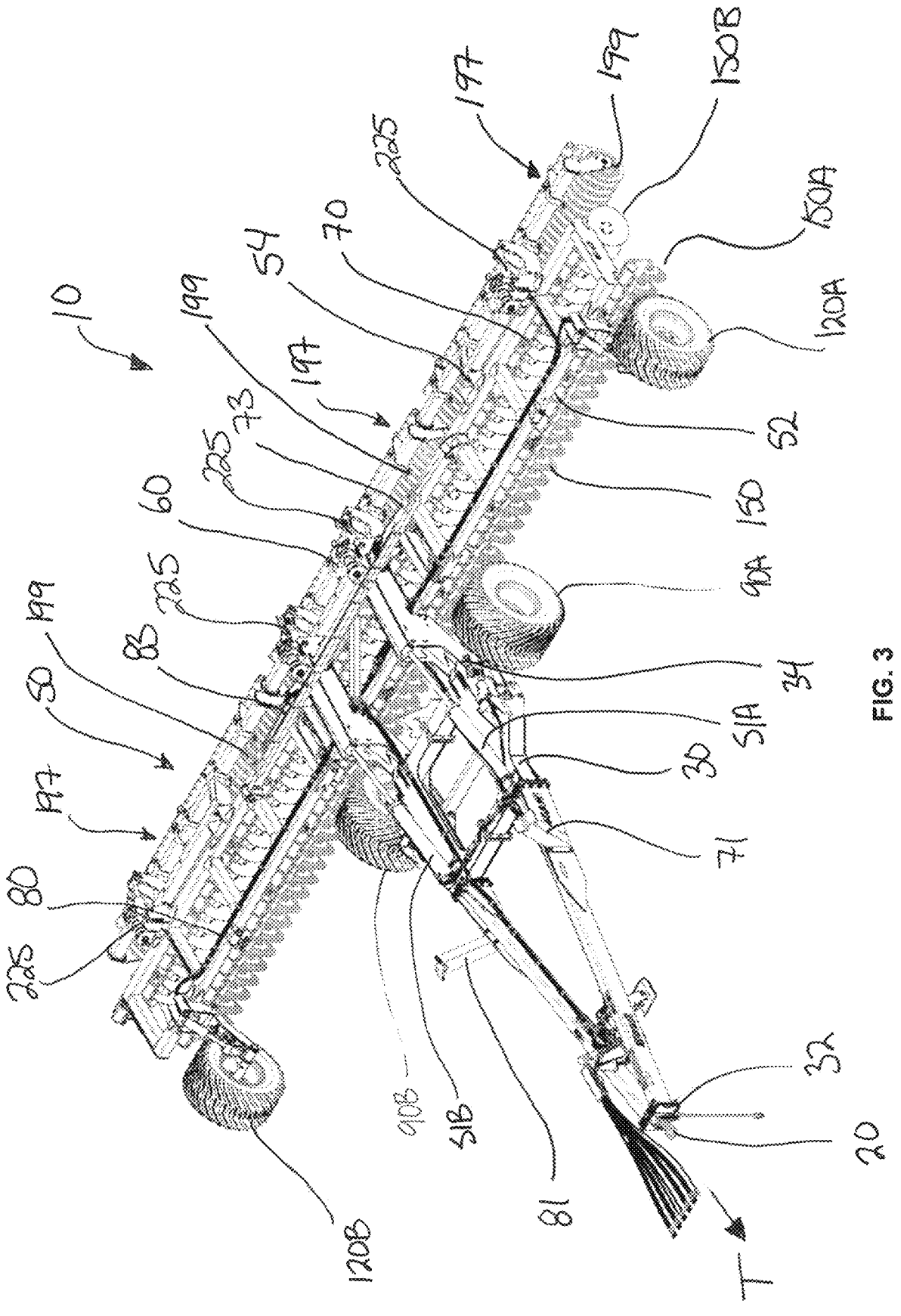
FIG. 3 is a perspective view of the cultivator shown in FIG. 1.
Figure 4:
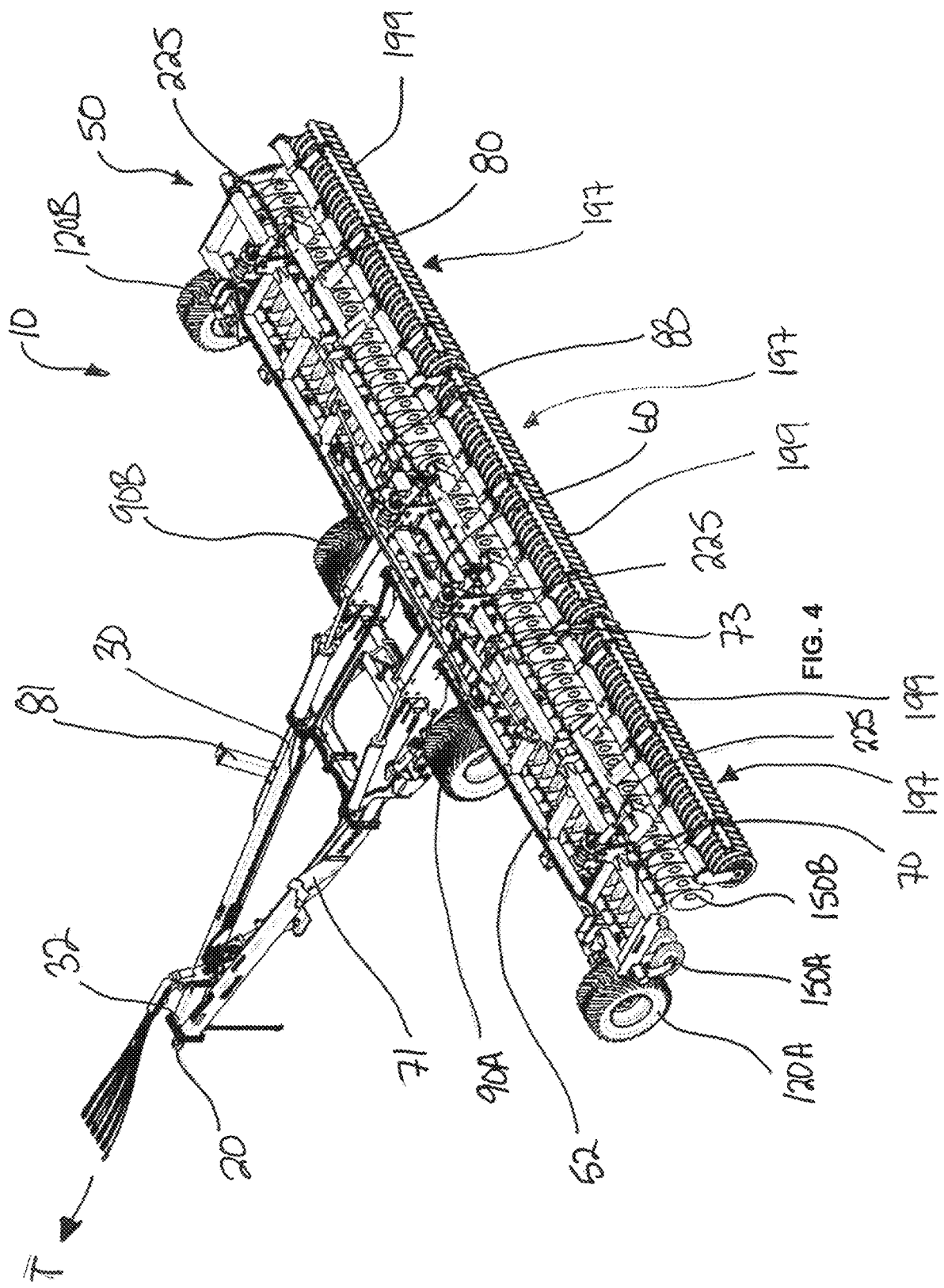
FIG. 4 is a rear perspective view of the cultivator shown in FIG. 1.
Figure 5:
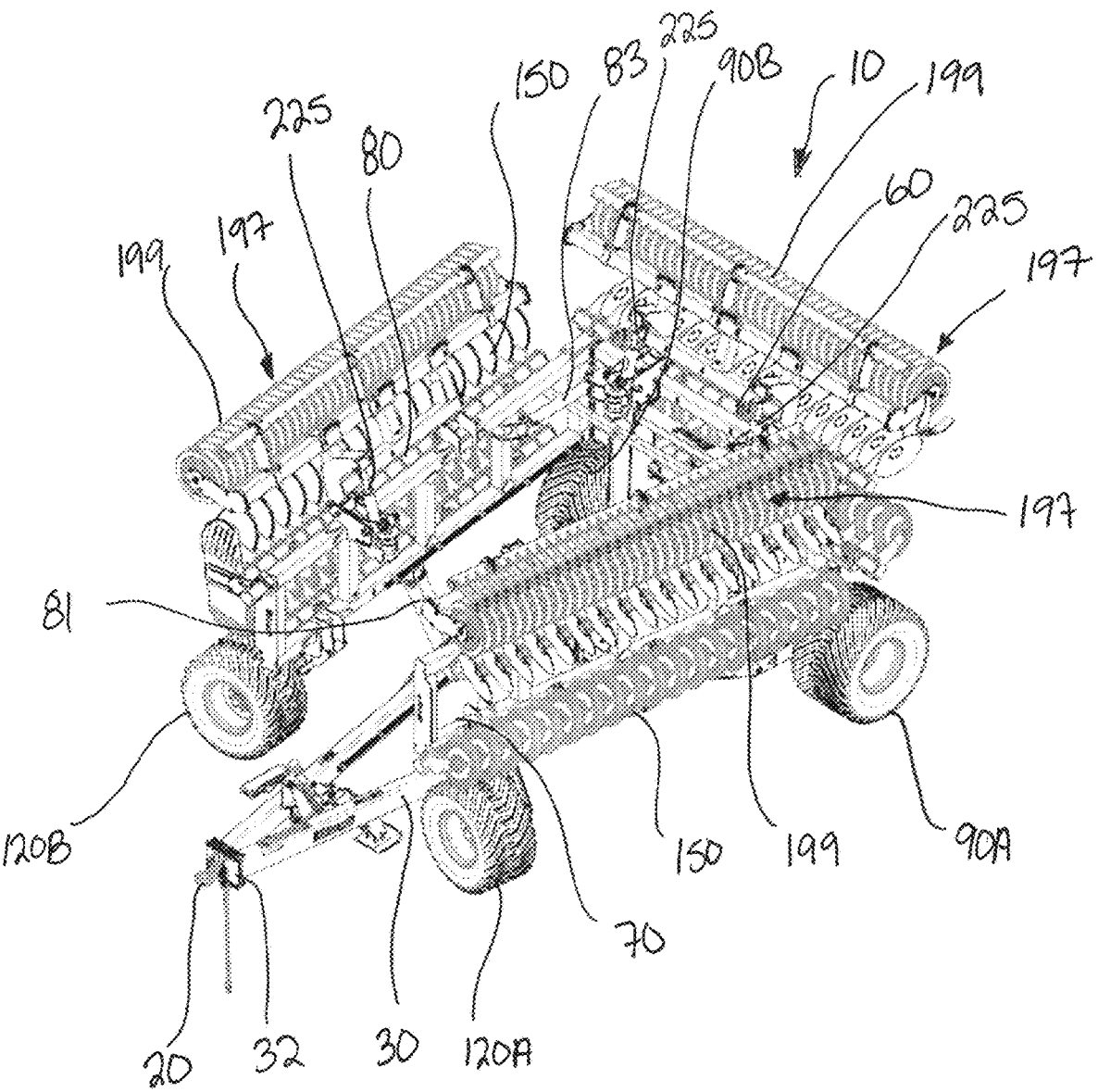
FIG. 5 is a perspective view of the cultivator shown in FIG. 1 in a transport position.

FIGS. 1-4 illustrate a cultivator 10 for cultivating or tilling a field, typically used for growing agricultural crops. The cultivator 10 is pulled behind a tow vehicle (not shown), while the cultivator 10 is in a field position (as shown in FIG. 1-4). Ground engaging tools 150 extend down from the cultivator 10 to penetrate into the soil of the field and till the soil in the field by agitating the soil as the cultivator 10 is pulled through the field by the tow vehicle. The cultivator 10 can be transformed into a transport position, as shown in FIG. 5, so that it can be towed from field to field, such as along a public roadway. The cultivator 10 can comprise: a hitch assembly 20; a main frame 30; a tilling section 50 having a rear frame 60, a first wing frame 70, and a second wing frame tilling section actuators 51A, 51B; a first wing actuator 73; a second wing actuator 83; a pair of main ground wheels 90A, 90B; a pair of wing ground wheels 120A, 120B; ground engaging tools 150; packing assemblies 197; and packer actuators 225.

The main frame 30 can have a front end 32 and a back end 34 with the hitch assembly 20 connected to the front end 32 of the main frame 30 for attachment to the tow vehicle (not shown) to tow the tow vehicle in a travel direction, T. The main frame 30 can be pivotally attached to the tilling section 50, comprising the rear frame 60, the first wing frame 70, and the second wing frame 80, by the back end 34 of the main frame 30 being pivotally connected to the rear frame 60 so that the rear frame 60 can pivot upwards around the back end 34 of the main frame 30.

The pair of main ground wheels 90A, 90B can be movably attached to the main frame 30 so that the main ground wheels 90A, 90B can be moved vertically relative to the main frame 30 to raise and lower the main frame 30 relative to the main ground wheels 90A, 90B and thereby alter the height of the main frame 30 above the ground surface.

A pair of tilling section actuators 51A, 51B, such as double acting hydraulic cylinders, can be provided extending between the main frame 30 and the rear frame 60. Retracting these tilling section actuators 51A, 51B will cause the rear frame 60 to pivot upwards relative to the main frame 30 and around the back end 34 of the main frame 30. Extending these tilling section actuators 51A, 51B will pivot the rear frame 60 downwards relative to the main frame 30 and around the back end 34 of the main frame 30.

The rear frame 60, the first wing frame 70, and the second wing frame 80 together form the tilling section 50 having a front end 52 and a back end 54.

A front end of the rear frame 60 can be pivotally connected to the back end 34 of the main frame 30 so that the rear frame 60 can pivot relative to the back end 34 of the main frame 30. A first side of the rear frame 60 can be pivotally connected to the first wing frame 70 and a second side of the rear frame 60 can be pivotally connected to the second wing frame 80.

The first wing frame 70 can be pivotally connected to a first side of the rear frame 60 so that the first wing frame 70 can pivot relative to the rear frame 60 around the first side of the rear frame 60. The first wing ground wheel 120A can be attached at a front end of the first wing frame 70 and movably attached so that the first wing ground wheel 120A can be moved vertically, relative to the front end of the first wing frame 70 to raise and lower the front end of the first wing frame 70 and adjust the height of the front end of the first wing frame 70 above the ground surface.

The second wing frame 80 can be pivotally connected to a second side of the rear frame 60 so that the second wing frame 80 can pivot relative to the rear frame 60 around the second side of the rear frame 60. The second wing ground wheel 120B can be attached at a front end of the second wing frame 80 and movably attached to the front end of the second wing frame 80 so that the second wing ground wheel 120B can be moved vertically, relative to the front end of the second wing frame 80, to raise and lower the front end of the second wing frame 80 and adjust the height of the front end of the second wing frame 80 above the ground surface.

The rear frame 60, the first wing frame 70 and the second wing frame 80 are tool frames for holding the ground engaging tools 150. The ground engaging tools 150 extend downwards beneath the tilling section 50 for penetrating the ground surface and agitating with the soil as the ground engaging tools 150 are pulled through the soil. The ground engaging tools 150 can be positioned in a first row of ground engaging tools 150A and a second row of ground engaging tools 150B in the tilling section 50. The first row of ground engaging tools 150A can be positioned in front of, and parallel to, the second row of ground engaging tools 150B.

Packer assemblies 197 can be attached to the back end 54 of the tilling section and have a packer roller 199 to pack and flatten the soil after it has been tilled up by the ground engaging tools 150 in the tilling section 50 with one packer assembly 197 attached behind the rear frame 60, one packer assembly 197 attached behind the first wing frame 70 and one packer assembly 197 attached behind the second wing frame 80. Each packer assembly 197 can be pivotally connected to the back end 54 of the tilling section 50. The packer actuators 225 allow the packer assemblies 197 to be selectively pivoted around the back end 54 of the tilling section 50.

The cultivator 10 can be transformed from the field position, as shown in FIGS. 1-4, to the transport position, shown in FIG. 5 for transport from field to field. The tilling section actuators 51A, 51B can be retracted to pivot the tilling section 50 upwards and specifically the rear frame 60 around the back end 34 of the main frame 30. This will lift the rear frame 60 as well as the first wing frame 70 and the second wing frame 80 that are attached to the sides of the rear frame 60, up off the ground surface. The main ground wheels 90A, 90B are attached to the main frame 30 so the main ground wheels 90A, 90B will remain in place as the tilling section 50 is pivoted upwards around the back end 34 of the main frame 30. As the tilling section 50 is pivoted upwards to perpendicular relative to the main frame 30, the weight of the tilling section 50 will move forward onto the main ground wheels 90A, 90B attached to the main frame 30.

When the tilling section 50 is pivoted to substantially perpendicular relative to the main frame 30, the first wing actuator 73 can be used to pivot the first wing frame 70 relative to the rear frame 60, forwards towards the front end 32 of the main frame 30 and the second wing actuator 83 can be used to pivot the second wing frame 80 relative to the rear frame 60, forwards towards the front end 32 of the main frame 30. The first wing frame 70 can be rested on, and connected to, a first wing brace 71 and the second side wing frame 80 can be rested on, and connected to, a second wing brace 81 to secure the first and second wing frames 70, 80 in the transport position shown in FIG. 5.

Figure 6:
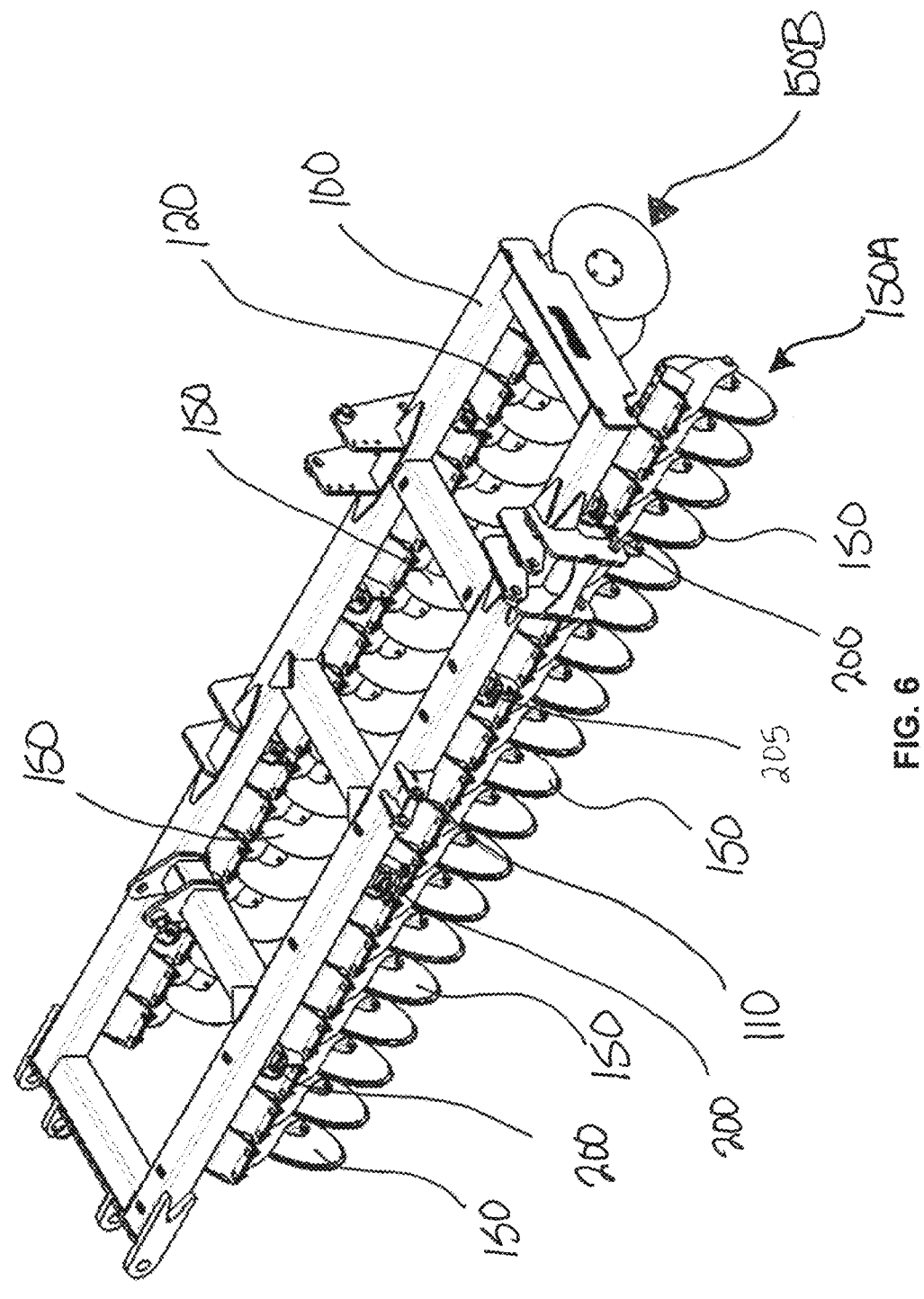
FIG. 6 is a perspective view of a tool frame having a number of ground engaging tools.

FIG. 6 shows a tool frame 100 that supports the ground engaging tools 150. The tool frame 100 could be rear frame 60, first wing frame 70 or second wing frame 80. The tool frame 100 can support a first mounting bar 110 and a second mounting bar 120. The first mounting bar 110 can be provided in front of the second mounting bar 120 so that when ground engaging tools 150 are connected to the first mounting bar 110 and the second mounting bar 120, the ground engaging tools 150 connected to the first mounting bar 110 form the first row of ground engaging tools 150A and the ground engaging tools 150 connected to the second mounting bar 120 form the second row of ground engaging tools 150B.

Figure 7:
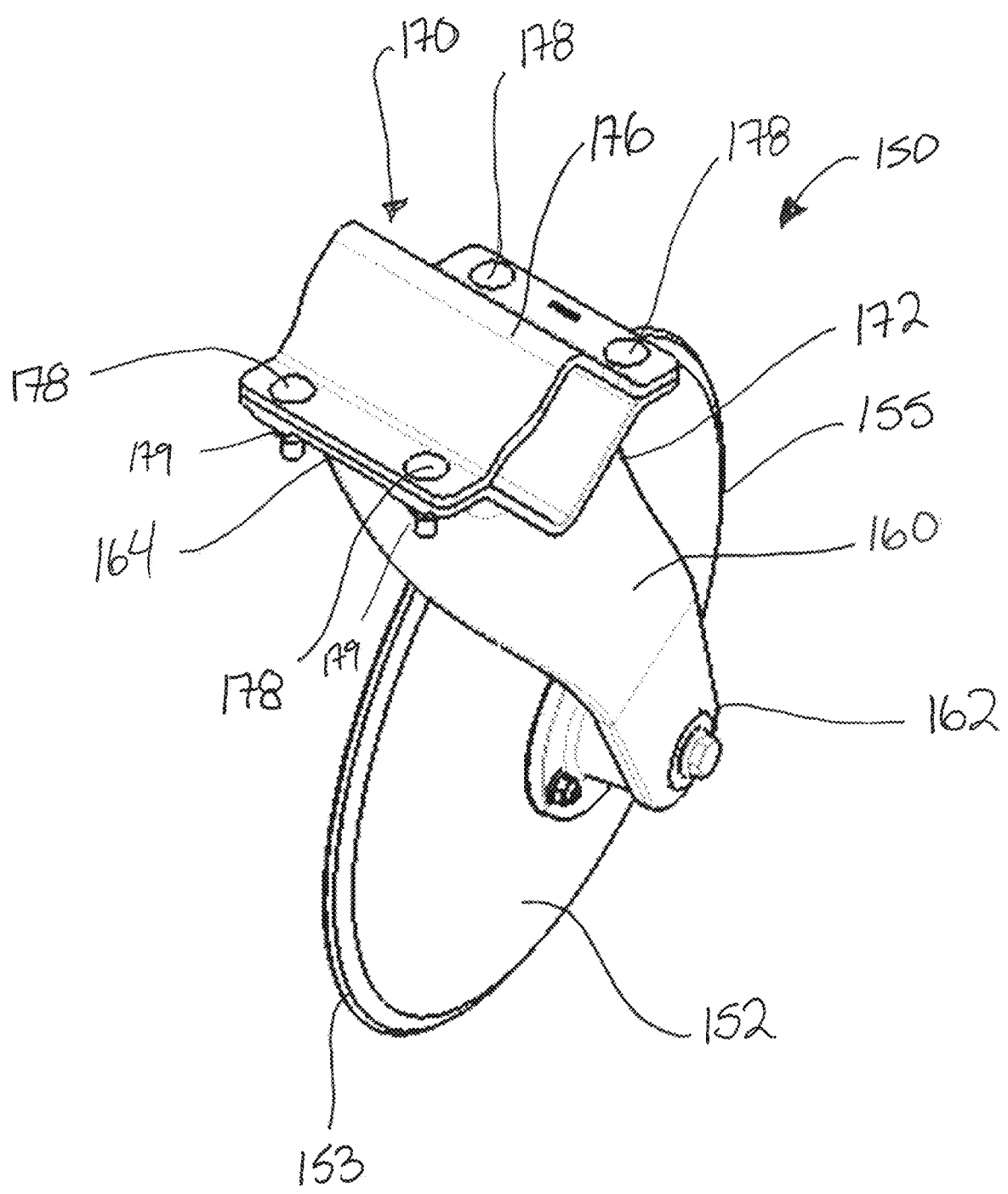
FIG. 7 is a perspective view of a ground engaging tool.
Figure 8:
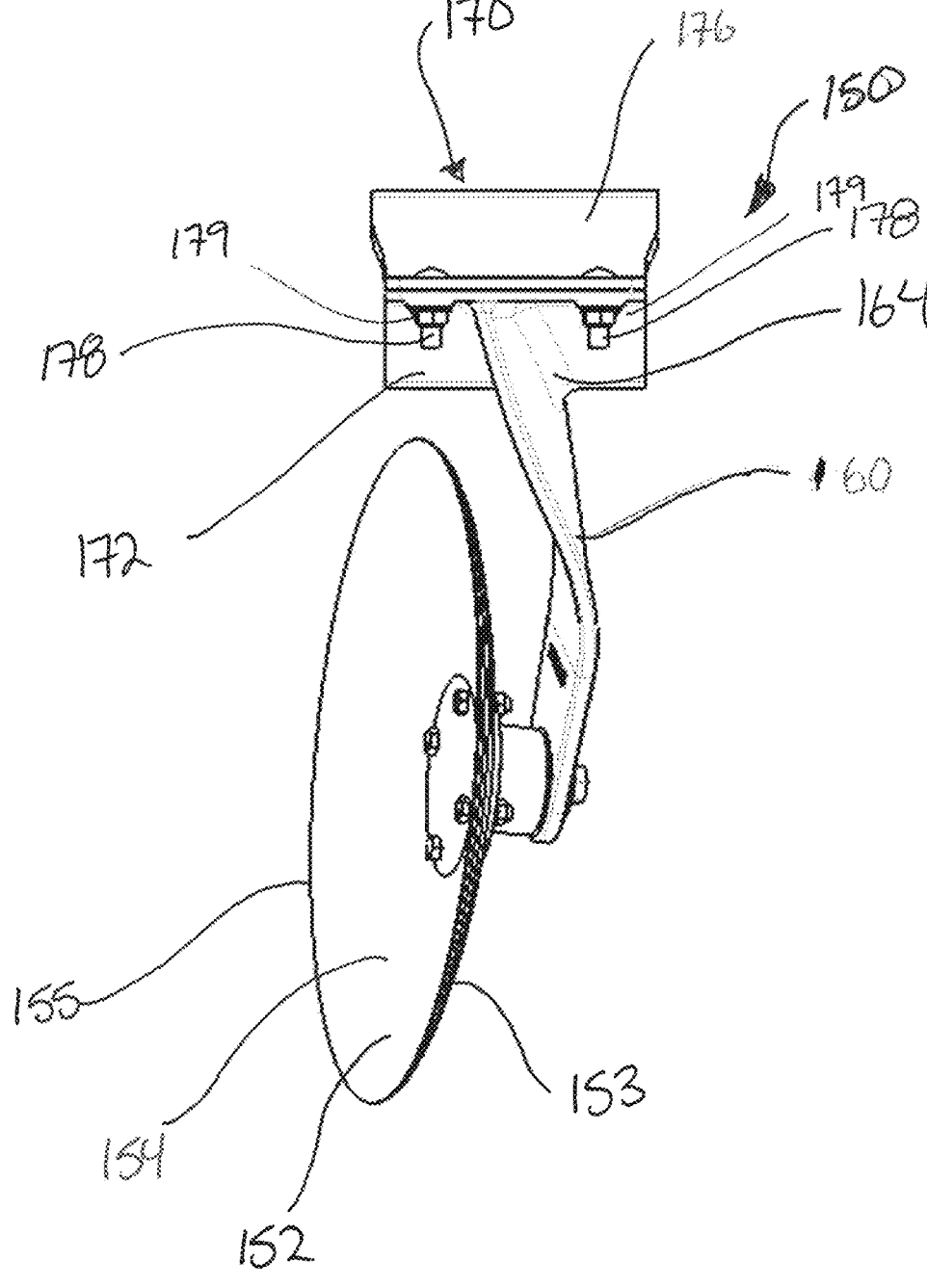
FIG. 8 is a front view of the ground engaging tool shown in FIG. 7.

FIG. 7 shows a ground engaging tool 150. The ground engaging tool 150 can have: a ground working tool, such as a disc 152; an arm 160; and an attachment mechanism 170.

Although FIG. 7 shows the disc 152 as a smooth disc, the disc 152 could also be a wavy disc, etc. The disc 152 can be rotatably attached to the arm 160 at a bottom end 162 of the disc arm 160 so that the disc 152 can rotate relative to the arm 160. A top end 164 of the arm 160 can be attached to the attachment mechanism 170.

Although a disc 152 is shown in the Figures, other types of ground working tools could also be used, depending on the intended application.

The disc 152 can be angled by the arm 160 so that the disc 152 is angled relative to a travel direction of the ground engaging tool 150 and cuts a parabolic shaped cutting profile in the soil as the ground engaging tool 150 is pulled through the soil in a field. The angling of the disc 152 causes the disc 152 to have a front cutting edge 153, a forward face 154, and a trailing edge 155.

The attachment mechanism 170 provided at the top end 164 of the arm 160 attaches the ground engaging tool 150 to one of the mounting bars 110, 120 shown in FIG. 6. The attachment mechanism 170 can have a bottom bracket 172 attached to the top end 164 of the arm 160 and a cap bracket 176 that connects to the bottom bracket 172. Bolt holes in the bottom bracket can align with bolt holes in the cap bracket 176 so that bolts 178 can be inserted through the aligned bolt holes to connect the cap bracket 176 to the bottom bracket 172 and nuts 179 can be used to secure the bolts 178 in place. The bottom bracket 172 and cap bracket 176 can form a diamond shape when the cap bracket 176 is connected to the bottom bracket 172.

Figure 9:
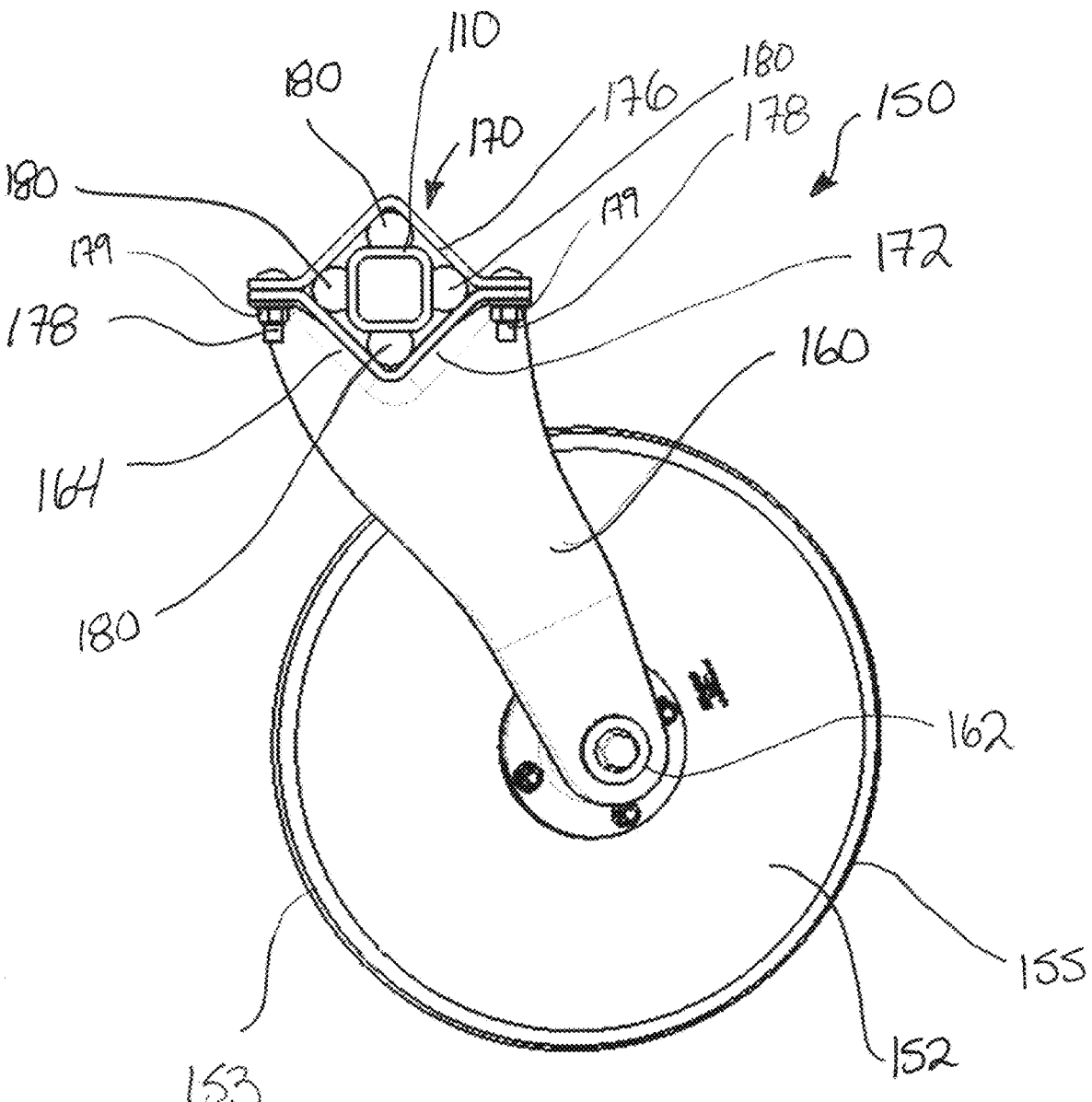
FIG. 9 is a side view of the ground engaging tool shown in FIG. 7 and mounted on a mounting bar.

Cylindrical torsion elements 180, shown in FIG. 9, can be provided in the corners of the diamond shape formed by the cap bracket 176 and the bottom bracket 172. When the attachment mechanism 170 is attached to a mounting bar 110 (or mounting bar 120), the torsion elements 180 will be positioned in between the corners of the diamond shaped opening between the cap bracket 176 and the bottom bracket 172 and the outer surfaces of the square-shaped mounting bracket 110 so that the torsion elements 180 isolate the attachment mechanism 170 from the mounting bar 110. This will allow the ground engaging tool 150 to move a bit relative to the mounting bar 110, 120, such as when the disc 152 encounters a rock in its path or a denser patch of soil.

The torsion elements 180 can be made of rubber or some other elastic material so that the torsion elements 180 can deform and compress under force, but revert ("spring back") into their original shape when the force stops being applied.

Referring again to FIG. 6, the attachment mechanism 170 of each ground engaging tool 150 can be bolted onto one of the mounting bars 110, 120 connected below the tool frame 100. Each mounting bar 110, 120 can have a square cross-section that is smaller than the square-shaped opening formed between the cap bracket 176 and the bottom bracket 172.

The mounting bar 110 can be attached to the tool frame 100 by a plurality of mounting brackets 200 and at least one adjustment mounting bracket 205.

To mount a ground engaging tool 150 on the first mounting bar 110 or the second mounting bar 120, the cap bracket 176 of the ground engaging tool 150 can be disconnected from the bottom bracket 172 and the bottom bracket 172, with the arm 160 extending from the bottom bracket 172, positioned below the mounting bar 110, 120. The torsion elements 180 can be provided in the corners of the diamond shape formed by the cap bracket 176 and the bottom bracket 172. The cap bracket 176 can then be connected to the bottom bracket 172, with the bolts 178 and nuts 179, so that the mounting bar 110, 120 passes through the opening formed by the cap bracket 176 and the bottom bracket 172 with the torsion elements 180 pressed against the outer surfaces of the mounting bar 110, 120, as shown in FIG. 9.

While the elastic deformation of the torsion elements 180 is desirable to allow the disc 152 of a ground engaging tool 150 to move up (or trip) when the disc 152 encounters a rock or a denser patch of soil, the torsion elements 180 can also allow lateral movement of the ground engaging tool 150 relative to the mounting bar 110, 120 that the ground engaging tool 150 is attached to. Each disc 152 is angled relative to the direction of travel of the cultivator 10 and the arm 160 positions the disc 152 at this angle. The angling of the disc 152 can place lateral forces on the torsion elements 180, connecting the ground engaging tool 150 to the cultivator 10, causing the torsion elements 180 to deform laterally as well as allowing the arm 160 to trip. As the torsion elements 180 deform laterally from these lateral forces, it can cause the attachment mechanism 170, with its cap bracket 176 and bottom bracket 172, to shift laterally relative to the mounting bar 110, 120 and therefore the entire ground engaging tool 150 to shift laterally.

If the ground engaging tool 150 shifts laterally, the disc 152 of the ground engaging tool 150 can shift laterally causing the cutting profile created by the disc 152 as it is pulled through the soil to be positioned laterally from where it was intended. This can be especially problematic if the spacings of the ground engaging tools 150 have been carefully set or adjusted to achieve a desired spacing, because the lateral shifting of the ground engaging tools 150 can negate this careful setting of the spacing.

Figure 10:
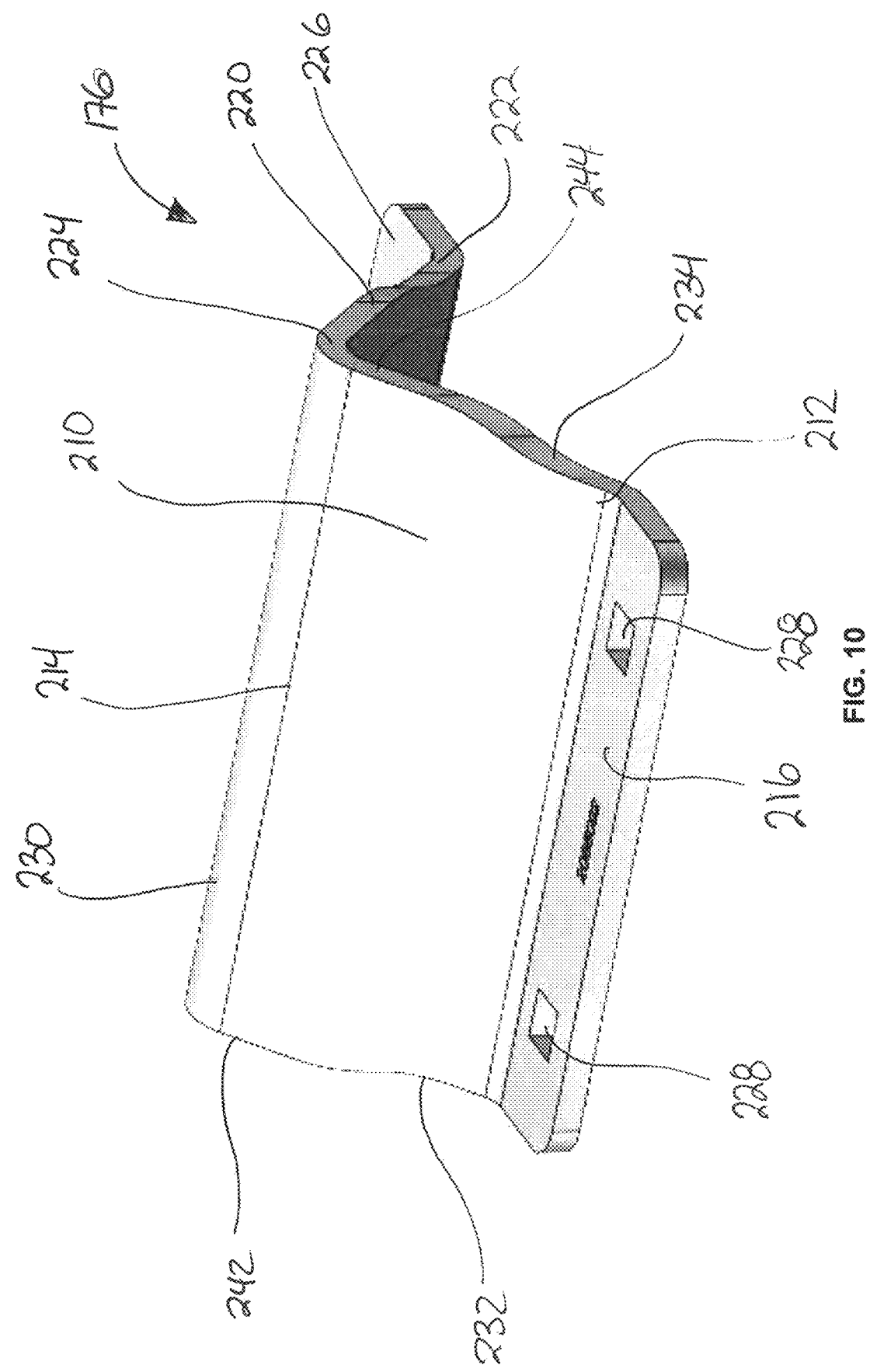
FIG. 10 is a perspective view of a cap bracket for attaching a ground engaging tool.

Referring to FIG. 10, the cap bracket 176 can have a first member 210 having a first side 212 and a second side 214, and a second member 220 having a first side 222 and a second side 224. The first member 210 can be joined at its second side 214 to the second side 224 of the second member 220 to from a triangular shape having a first end 232 and a second end 234. A peak 230 can be formed where the second side 214 of the first member 210 connects to the second side 224 of the second member 220. A first connection flange 216 can extend from the first side 212 of the first member 210 and a second connection flange 226 can extend from the first side 222 of the second member 220. The first connection flange 218 can have apertures 228 passing through it and the second connection flange 226 can have apertures (not shown) passing through it to allow the cap bracket 176 to be connected to the bottom bracket 172.

The cap bracket 176 can have an first extended portion 242 on a first end 232 of the cap bracket 176 at the peak 230 of the cap bracket 176 and a second extended portion 244 on a second end 234 of the cap bracket 176 at the peak 230 of the cap bracket 176.

Figure 11:
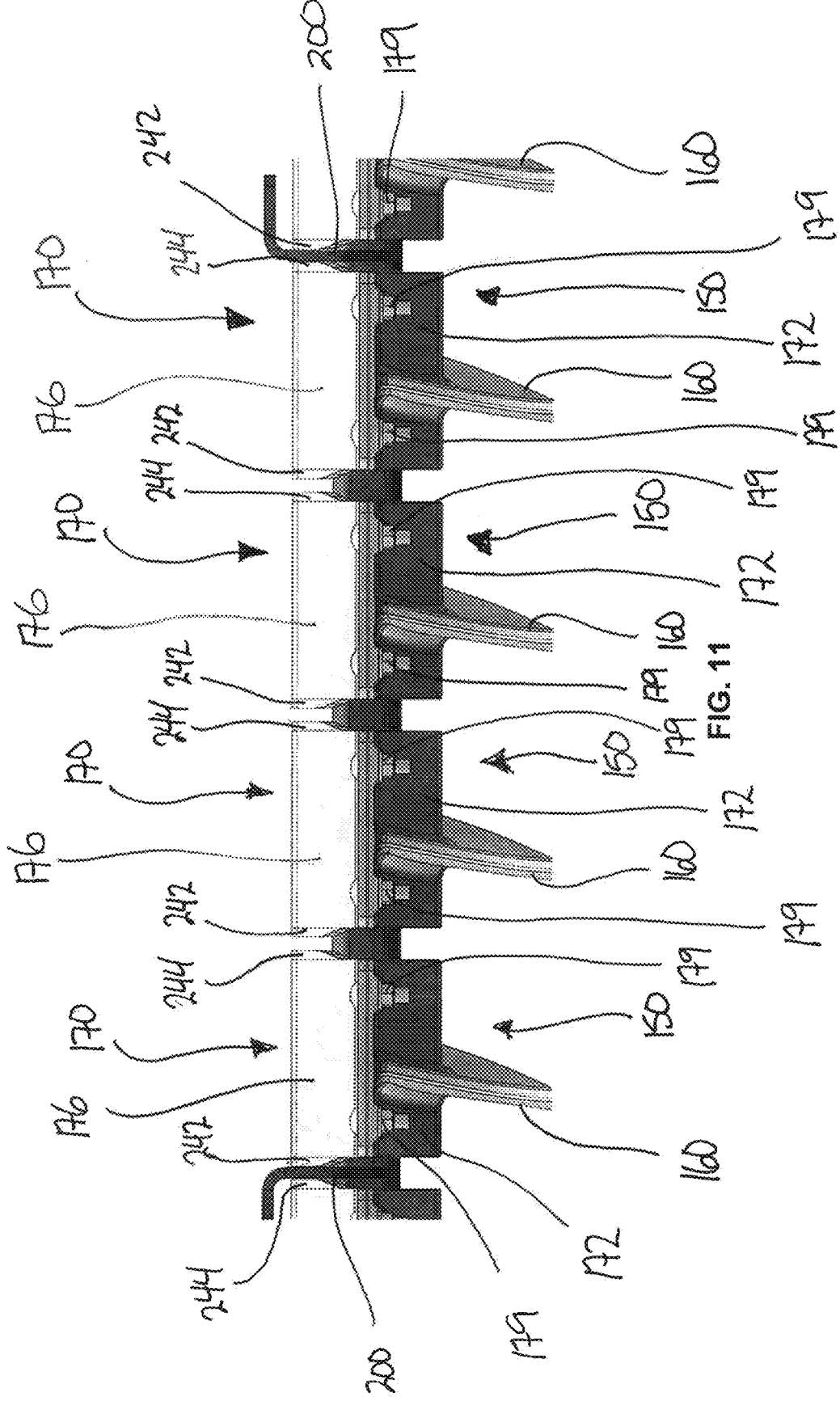
FIG. 11 is a front view of ground engaging tools secured to a mounting bar with cap brackets.

Referring to FIG. 11, the extended portions 242, 244 on the cap brackets 176 can come into contact with the extended portions 242, 244 of adjacent cap brackets 176 if any significant lateral deformation of the torsion elements 180 occurs causing the lateral drift of the ground engaging tools 150. The extended portions 242, 244 can be positioned on the cap bracket 176 where primarily rotational movement occurs and little to no vertical movement so that the extended portions 242, 244 do not jam with adjacent extended portions 242, 244 and prevent normal movement.

Where the mounting brackets 200 or adjustment mounting bracket 205 is provided to connect the mounting bar 110 to the tool frame 100 (not shown), the extended portion 242, 244 can be adjacent or even abut the mounting bracket 200 or adjustment mounting bracket 205. The spacing between extended portions 242, 244 on adjacent cap brackets 176 can be such that the mounting bracket 200 or the adjustment mounting bracket 205 can be positioned passing through this spacing and allow adjacent cap brackets 176 to be spaced at the same distance as adjacent cap brackets 176 that do not have a mounting bracket 200 or an adjustment mounting bracket 205 positioned between them. This allows the ground engaging tools 150 to be spaced apart at regular intervals.

Figure 12:
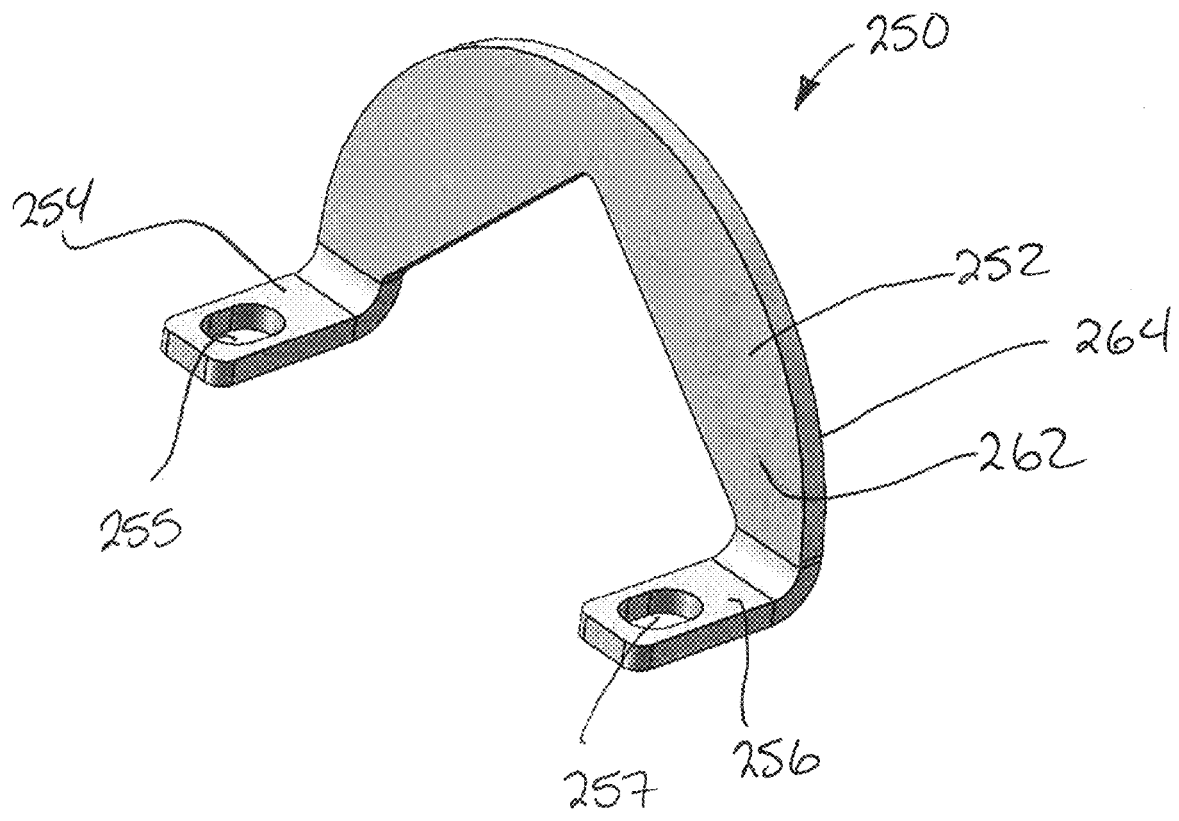
FIG. 12 is a perspective first side view of a spacer.
Figure 13:
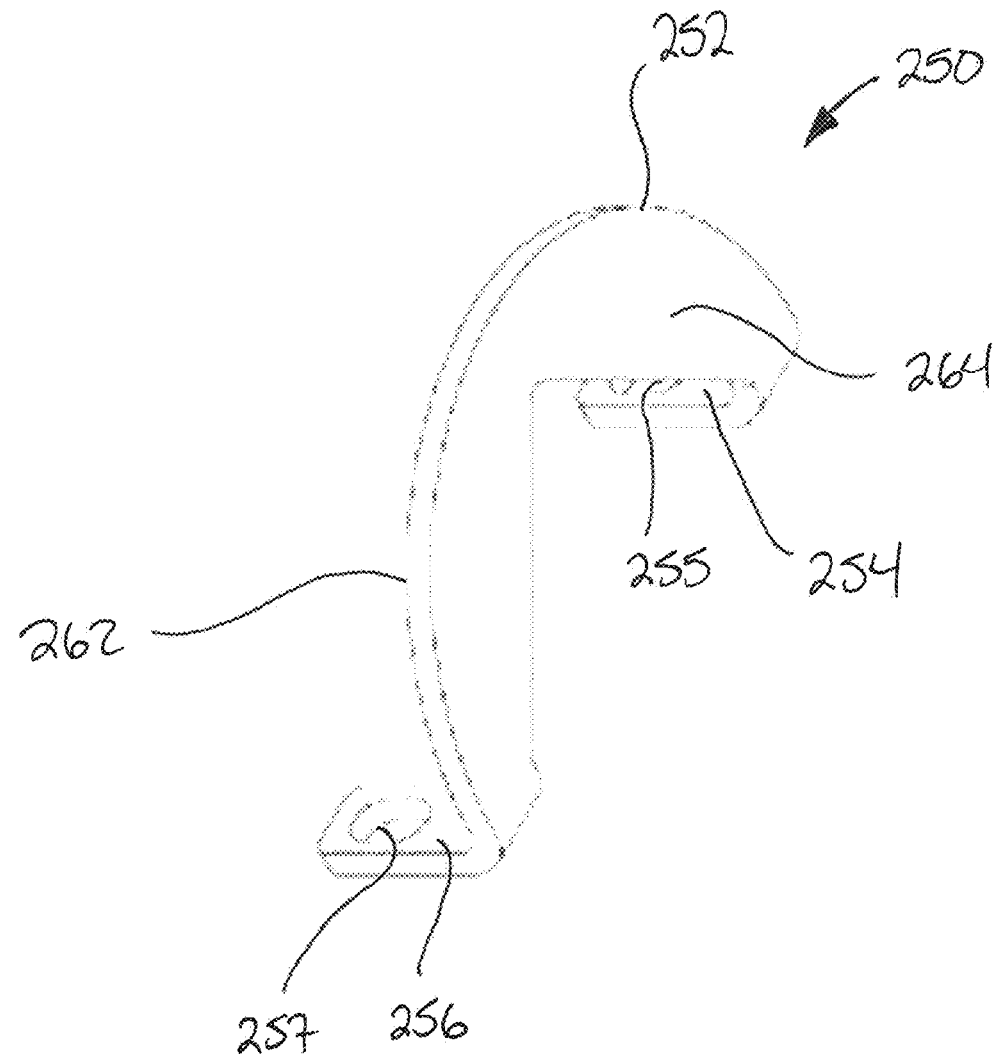
FIG. 13 is a perspective second side view of the spacer of FIG. 12.

Referring to FIGS. 12 and 13, a spacer 250 can be provided for maintaining the space between adjacent attachment mechanisms 170. In some cases, it may be desirable to add spacers 250 between adjacent attachment mechanisms 170 to more precisely maintain the spacing between the adjacent attachment mechanism 170.

The spacer 250 can include a spacer member 252, a first connection flange 254 and a second connection flange 256. The spacer member 252 can extend upwards from the first connection flange 254 and the second connection flange 256 and define a contact surface 264.

The contact surface 264 can have a surface area with a periphery outside the path of an arc the extended portions 242, 244 of an adjacent cap brackets 176 moves along as the cap bracket 176 is rotated around the mounting bar 110. In this manner, the extended portions 242, 244 of an adjacent cap bracket 176 can always abut the contact surface 264 of the spacer member 252, even when the extended portion 242, 244 of the cap bracket 176 moves through an arc as the cap bracket 176 rotates around the mounting bar 110.

The first connection flange 254 and the second connection flange 256 can extend laterally from a bottom of the spacer member 252. An aperture 255 can be provided in the first connection flange 254 and an aperture 257 can be provided in the second connection flange 256.

Figure 14:
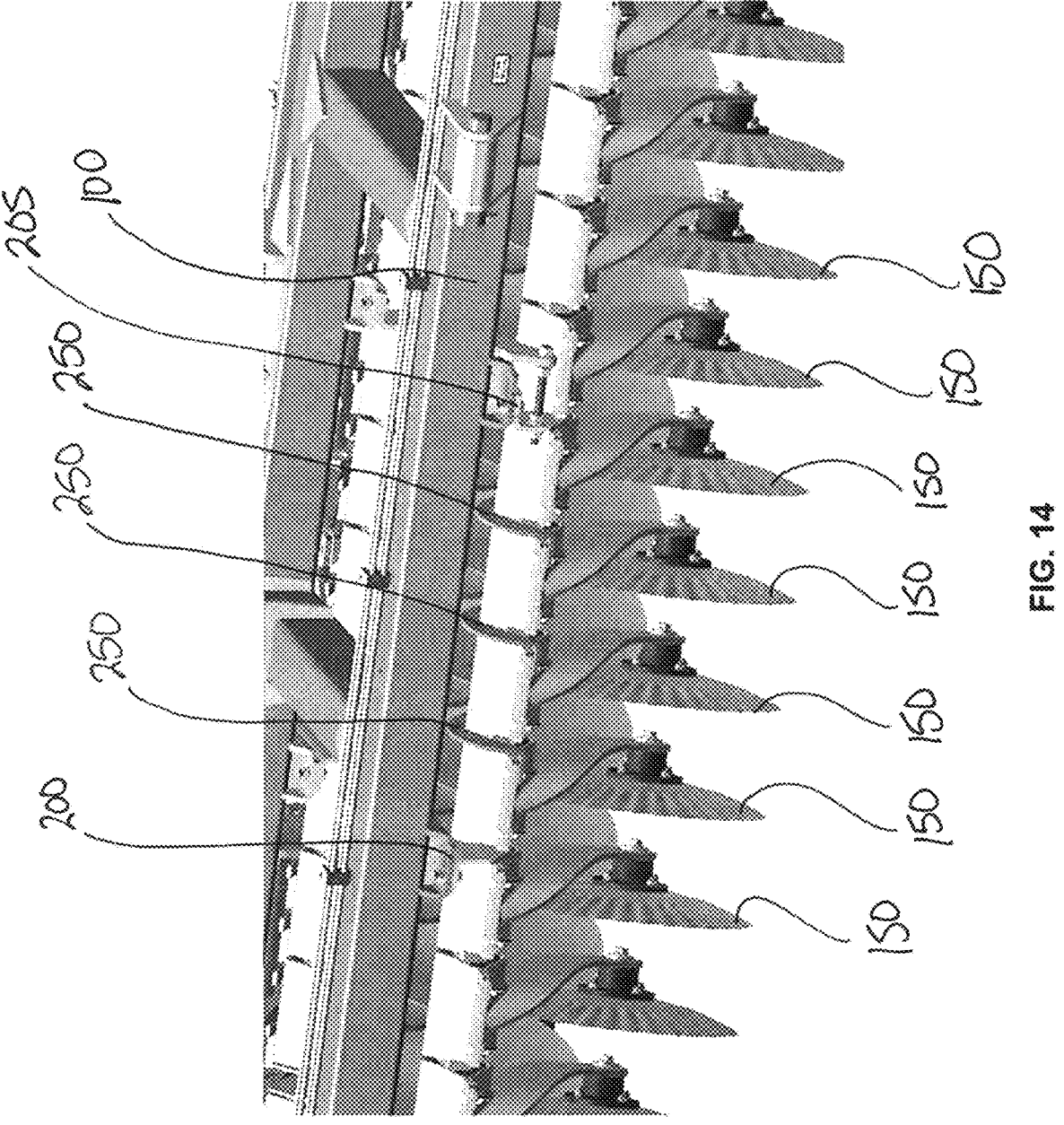
FIG. 14 is a perspective view of spacers installed between attachment mechanisms of ground engaging tools.

Referring to FIG. 14, the spacers 250 can be installed between adjacent attachment mechanisms 170 of ground engaging tools 150 and more specifically between the cap brackets 176 of the attachment mechanisms 170. These spacers 250 can be installed wherever they are desired, that does not have a mounting bracket 200 or an adjustment mounting bracket 205 positioned between cap brackets 176, to maintain the spacing of the cap brackets 176.

Figure 15:
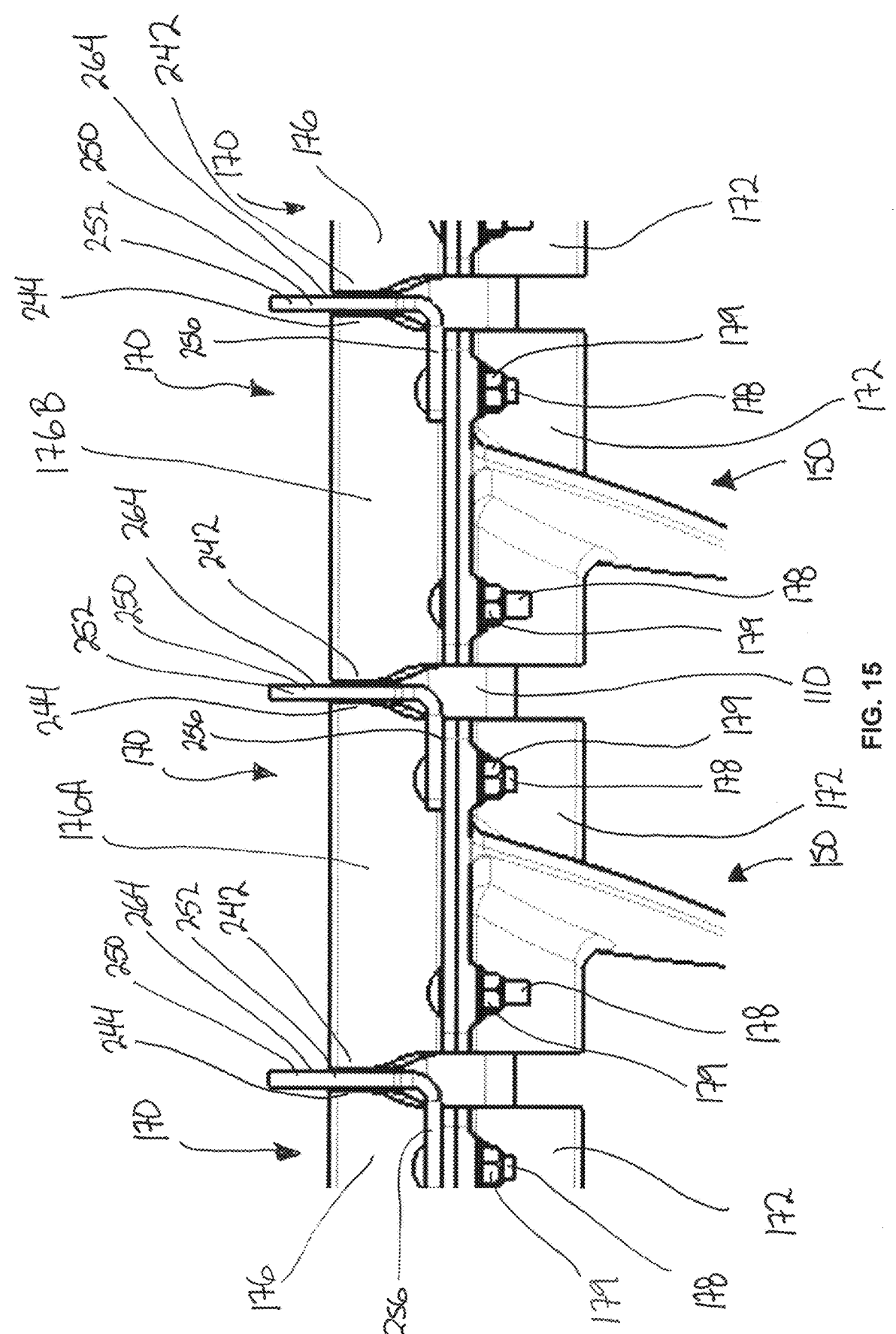
FIG. 15 is a close up view of a spacer installed between adjacent attachment mechanisms of a ground engaging tool.

Referring to FIG. 15, to install a spacer 250 between adjacent cap brackets 176, the nuts 179 on the bolts 178 can be removed from one side of the attachment mechanism 170. The spacer 250 can then be positioned so that the portions of the bolts 178 extending below the attachment mechanism 170 pass through the apertures 255, 257 in the connection flanges 254, 256, with the spacer member 252 positioned extending upwards and adjacent to the extended portion 242 of the cap bracket 176. The nuts 179 can then be threaded back onto the bolts 178 and tightened against the connect flanges 254, 256 of the spacer 250 to install the spacer 250 in place.

If one of the ground engaging tool 150 is subjected to a lateral force that tries to shift the ground engaging tool 150 laterally, the attachment mechanisms 170 and therefore the cap brackets 176 of the attachment mechanisms 170 can start to shift laterally. As the cap bracket 176B, adjacent to the cap bracket 176A the spacer 250 is attached to, shifts laterally towards the spacer 250, the extended portion 244 of cap bracket 176B can come into contact with the contact surface 264 of the spacer 250, preventing further lateral shifting of the adjacent cap bracket 176B and therefore the ground engaging tool 150 having the cap bracket 176B.

The contact surface 264 has a surface area with a periphery outside the path of an arc the extended portion 244 of the adjacent cap bracket 176B will travel through as the cap bracket 176B rotates around a mounting bar 110, so even if the ground engaging tool 150 hits a rock or denser patch of soil and trips, causing the cap bracket 176 to rotate around the mounting bar 110, the extended portion 244 will travel through an arc, but can remain in contact with the contact surface 264 of the spacer 250.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A cultivator comprising: a hitch assembly connectable to a tow vehicle to tow the cultivator in a travel direction;
a tilling section having a front end and a back end;
a tool frame provided in the tilling section;
a mounting bar provided below the tool frame;
at least two adjacent ground engaging tools connected to and extending below the mounting bar, each ground engaging tool comprising:
a bottom bracket;
a cap bracket connectable to the bottom bracket, for attachment to the mounting bar, the cap bracket comprising:
a first member having a first side and a second side;
a second member having a first side and a second side, the second member joined at the second side to the second side of the first member;
a peak formed where the second side of the first member is joined at the second side of the second member; and
a first extended portion extending laterally from a first end of the cap bracket at the peak so that the first extended portion at the peak extends further laterally than the first end of the cap bracket at the first side of the cap bracket;
an arm attached at a top end to the bottom bracket; and
a ground working tool attached to a bottom end of the arm.

2. The cultivator of claim 1 wherein torsion elements are provided between the cap bracket and the mounting bar and between the bottom bracket and the mounting bar.

3. The cultivator of claim 2 wherein the torsion elements are made from an elastic material.

4. The cultivator of claim 1 wherein the first member and the second member of the cap bracket from a triangular shape.

5. The cultivator of claim 1 wherein a first connection flange extends from the first side of the first member and a second connection flange extends from the first side of the second member.

6. The cultivator of claim 5 further comprising apertures passing through the first connection flange and apertures passing through the second connection flange.

7. The cultivator of claim 1 further comprising a second extended portion extending laterally from a second end of the cap bracket at the peak so that the second extended portion at the peak extends further laterally than the second end of the cap bracket at the first side of the cap bracket.

8. The cultivator of claim 1 wherein the ground working tool is a disc.

9. The cultivator of claim 8 wherein the disc is angled by the disc arm to be at an angle to the travel direction.

10. The cultivator of claim 1 wherein the bottom bracket and the cap bracket form a diamond shape when the cap bracket is connected to the bottom bracket.

11. The cultivator of claim 10 wherein torsion elements are provided in corners of the diamond shape formed by the cap bracket and the bottom bracket and between the cap bracket, the bottom bracket and the mounting bar.

12. The cultivator of claim 1 wherein the mounting bar has a square cross section.

13. The cultivator of claim 1 further comprising a spacer positioned between the cap brackets of the at least two adjacent ground engaging tools.

14. The cultivator of claim 13 wherein the spacer comprises:

a first connection flange;

a second connection flange; and a spacer member extending upwards from the first connection flange and the second connection flange, between the cap brackets of the at least two adjacent ground engaging tools, to define a contact surface.

15. The cultivator of claim 14 wherein the contact surface has a periphery outside a path of an arc the first extended portion of an adjacent cap bracket moves along as the cap bracket is rotated around the mounting bar.

16. The cultivator of claim 14 wherein the first extended portion of the cap bracket of one of the ground engaging tools abuts the contact surface of the spacer.

17. The cultivator of claim 14 wherein the first connection flange and the second connecting flange extend laterally from ends of the spacer member.

18. The cultivator of claim 17 wherein the first connection flange has an aperture passing therethrough and the second connection flange has an aperture passing therethrough.

19. A ground engaging tool connectable to a mounting bar on a cultivator, the ground engaging tool comprising:

a bottom bracket;

a cap bracket connectable to the bottom bracket, for attachment to the mounting bar, the cap bracket comprising:

a first member having a first side and a second side;

a second member having a first side and a second side, the second member joined at the second side to the second side of the first member;

a peak formed where the second side of the first member is joined at the second side of the second member; and a first extended portion extending laterally from a first end of the cap bracket at the peak so that the first extended portion at the peak extends further laterally than the first end of the cap bracket at the first side of the cap bracket;

an arm attached at a top end to the bottom bracket; and a ground working tool attached to a bottom end of the arm.

20. The ground engaging tool of claim 19 wherein the bottom bracket and the cap bracket form a diamond shape when the cap bracket is connected to the bottom bracket.

21. The ground engaging tool of claim 19 further comprising a second extended portion extending laterally from a second end of the cap bracket at the peak so that the second extended portion at the peak extends further laterally than the second end of the cap bracket at the first side of the cap bracket.

22. The ground engaging tool of claim 19 wherein a first connection flange extends from the first side of the first member and a second connection flange extends from the first side of the second member.

23. The ground engaging tool of claim 19 wherein the ground working tool is a disc.

24. The ground engaging tool of claim 23 wherein the disc is angled by the disc arm to be at an angle to the travel direction.

25. A cap bracket for connecting a ground engaging tool to a mounting bar of a cultivator, the cap bracket comprising:

a first member having a first side and a second side;

a second member having a first side and a second side, the second member joined at the second side to the second side of the first member;

a peak formed where the second side of the first member is joined at the second side of the second member; and a first extended portion extending laterally from a first end of the cap bracket at the peak so that the first extended portion at the peak extends further laterally than the first end of the cap bracket at the first side of the cap bracket.

26. The cap bracket of claim 25 further comprising a second extended portion extending laterally from a second end of the cap bracket at the peak so that the second extended portion at the peak extends further laterally than the second end of the cap bracket at the first side of the cap bracket.

27. The cap bracket of claim 25 wherein a first connection flange extends from the first side of the first member and a second connection flange extends from the first side of the second member.

28. The cap bracket of claim 27 further comprising apertures passing through the first connection flange and apertures passing through the second connection flange.

29. A spacer for positioning between an adjacent pair of cap brackets, each cap bracket used to attach a ground engaging tool to a cultivator, the spacer comprising:

a first connection flange;

a second connection flange; and a spacer member extending upwards from the first connection flange and the second connection flange to define a contact surface positionable between the adjacent pair of cap brackets, wherein each cap bracket, in the adjacent pair of cap brackets, is attached to a bottom bracket that is attached to a ground engaging tool by an arm.

30. The spacer of claim 29 wherein the contact surface has a periphery outside a path of an arc an extended portion of an adjacent cap bracket, extending laterally from a first side of the cap bracket, moves along as the cap bracket is rotated around a mounting bar.

31. The spacer of claim 30 wherein the extended portion of the adjacent cap bracket abuts the contact surface of the spacer.

32. The spacer of claim 29 wherein the first connection flange and the second connecting flange extend laterally from ends of the spacer member.

33. The spacer of claim 32 wherein the first connection flange has an aperture passing therethrough and the second connection flange has an aperture passing therethrough.

* * * * *